Nov. 18, 1958

M. RETTINGER

MAGNETIC HEADS AND REPLACEABLE POLE CAP ASSEMBLIES THEREFOR 2,861,135

Filed Feb. 3, 1956

2 Sheets-Sheet 1

INVENTOR.
MICHAEL RETTINGER
BY Val R. Gorham
ATTORNEY.

INVENTOR.
MICHAEL RETTINGER
BY
Orl R. Goshaw
ATTORNEY.

2,861,135

MAGNETIC HEADS AND REPLACEABLE POLE CAP ASSEMBLIES THEREFOR

Michael Rettinger, Encino, Calif., assignor to Radio Corporation of America, a corporation of Delaware Application February 3, 1956, Serial No. 563,278

9 Claims. (Cl. 179—100.2)

This invention relates to transducers such as ring type magnetic recording, reproducing and erase heads used in sound recording and reproducing systems and particularly to replaceable pole tip or cap assemblies for such heads.

It is well known that the friction between the pole tips of magnetic heads and the magnetic sound medium causes wear of the pole tips and thereby shortens the useful life of the magnetic head. Thus a magnetic head resembles mechanical transducers of the phonograph styli type which are subject to wear and must be replaced periodically. Since the wear occurs only on the pole tips the use of replaceable tips has been suggested as evidenced by Kornei U. S. Patent No. 2,711,945 of June 28, 1955. Other forms of replaceable pole cap constructions have also been suggested, many of which have costly constructions, poor sensitivity, and poor frequency response characteristics.

The present invention has eliminated the disadvantages of prior replaceable pole caps by utilizing a sturdily built, not solid, but laminated pole tip assembly which can be changed by anyone with the aid of a simple screwdriver. Locating or registering pins circumvent alignment problems when the replacement assembly, with its corresponding locating pin holes, takes the place of a worn unit.

The front gap pole face tip can be of the same order as that of integral laminated heads and tips used heretofore. The main part of the pole cap assembly consists of two opposing, solid machined brass sections to form a holder which can be salvaged after the laminated core tips have been worn away and which can be used again if desired. The core tips are made of laminated Permalloy, Mumetal, or other high permeability material, and are plasticized in the brass holder with a special thermosetting casting resin with a small shrinkage factor. The front pole faces are then lapped as a unit on a diamond lap after insuring that all faces are in the same plane. When the required front gap spacers have been inserted between the two halves of the pole cap, the halves are screwed together. The pole cap assembly is then attached to the cores by a screw through each section of the assembly.

The principal object of the invention, therefore, is to facilitate the replacement of pole tips on magnetic heads.

Another object of the invention is to provide an improved magnetic head with laminated replaceable pole tips.

A further object of the invention is to provide an improved magnetic head construction and an improved laminated pole cap assembly which is easily replaceable as a unit after the pole tips of the old unit have become worn.

The novel features which are believed to be characteristic of this invention, both as to the manner of its organization and the mode of its operation, will be better understood from the following description when read in conjunction with the accompanying drawings, in which.

Figure 1:
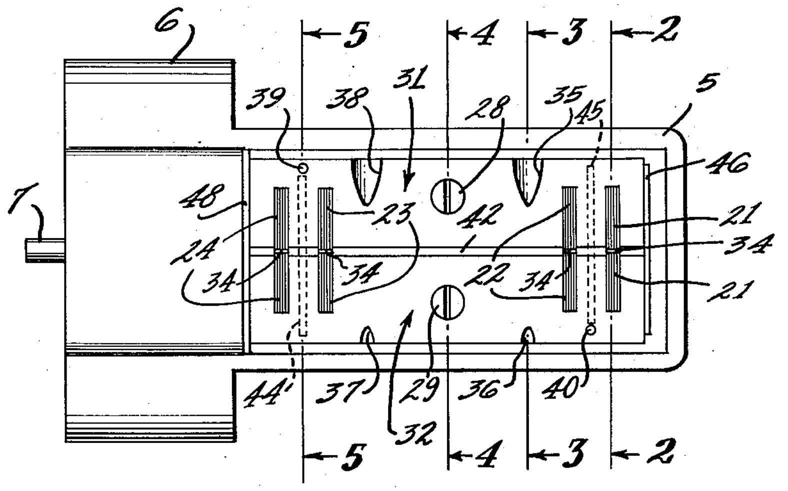
Fig. 1 is a plan view of a complete magnetic transducer embodying the invention.

Referring, now, to the drawings in which the same reference numerals indicate like elements, a mounting frame of brass or similar non-magnetic material has a rectangular portion 5 open on one side and an enlarged portion 6 with a mounting pin 7 and mounting holes 8. Within the rectangular portion 5 are two wall sections or ribs 11 and 12 positioned parallel with and spaced from the side walls of the portion 5. Although one or more heads may be mounted in portion 5, the particular transducer illustrated has four magnetic heads, each of which has a laminated core of Permalloy or other suitable material, the core being shown having two L-shaped sections 15 and 16 spaced by a rear gap 17 having a suitable spacer therein. The cores for the other heads are of the same construction. This general construction is disclosed in my copending application, Serial No. 350,188, filed April 21, 1953, now U. S. Patent No. 2,756,280, patented on July 24, 1956.

Figure 4:
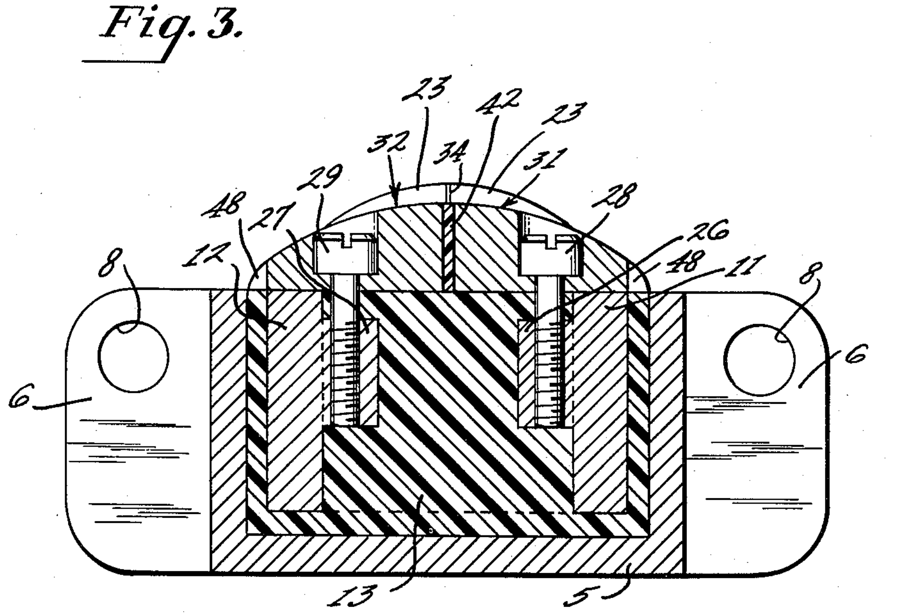
Fig. 4 is a cross sectional view of the transducer taken along the line 4—4 of Fig. 1 to show how the pole cap assembly is fastened to the core.

Around each of the core sections 15 and 16 are electrical windings 18 and 19, respectively, with appropriate conductors, not shown, leading therefrom. Although the cross section in Fig. 2 is taken along the line 2—2 of Fig. 1, the same cross section would appear if taken through any of the pole tips 22, 23, and 24. As shown in Fig. 4, the ribs 11 and 12 have integral, centrally located bosses 26 and 27, respectively, which have threaded holes therein to receive respective screws 28 and 29. When the cores have been assembled, a special casting resin 13, having a small shrinkage factor, is poured in the spaces within the frame portion 5 between the ribs 11 and 12, cores 15 and 16, and the windings 18 and 19.

Figure 2:
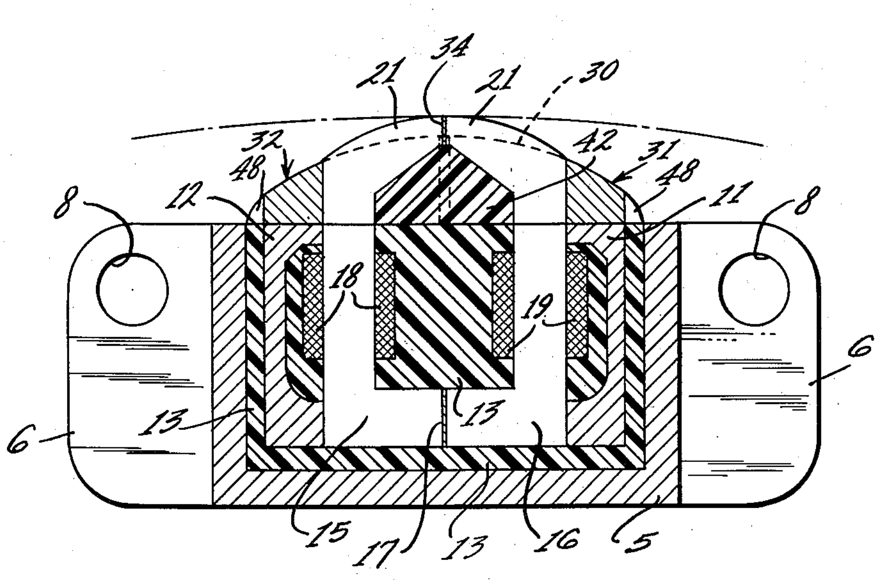
Fig. 2 is a cross sectional view of the transducer taken along the line 2—2 of Fig. 1 to show the core assembly.
Figure 3:
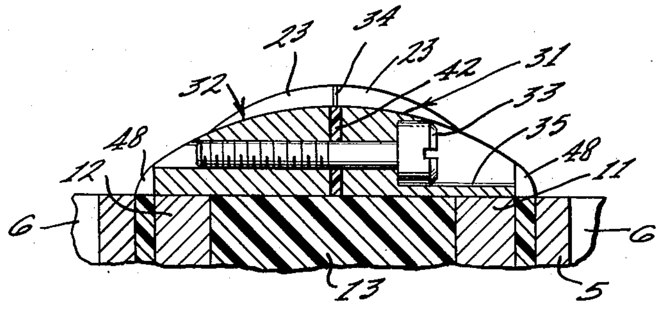
Fig. 3 is a partial cross sectional view of the transducer taken along the line 3—3 of Fig. 1 to show how the sections of the pole cap assembly are fastened together.

Referring, now, to the pole cap assembly, the assembly comprises two substantially identical sections 31 and 32 forming a holder assembly having a flat surface to contact the surface of the frame members 11 and 12 and the cores of the four heads, such as shown at 15 and 16. The outer surface of the holder assembly has a curvature as shown by the dotted line 30. In the edges of the sections 31 and 32, opposing slots are cut, the number of slots depending upon the number of heads to be included in the replaceable pole cap assembly. In these slots are inserted laminated pole tips, four pair being shown at 21, 22, 23, and 24, with cross sections as shown in Fig. 2. The upper ends of the tips are separated by spacers 34, while the other ends of the tips are adapted, when installed, to abut the upper ends of the cores 15 and 16. The two sections 31 and 32 and the tips 21, 22, 23, and 24 are held in assembled position by two screws 33, one of which is shown in Fig. 3. These screws have their heads in the notches 35 and 38, the respective screw holes extending through section 32 as shown at 36 and 37.

Figure 5:
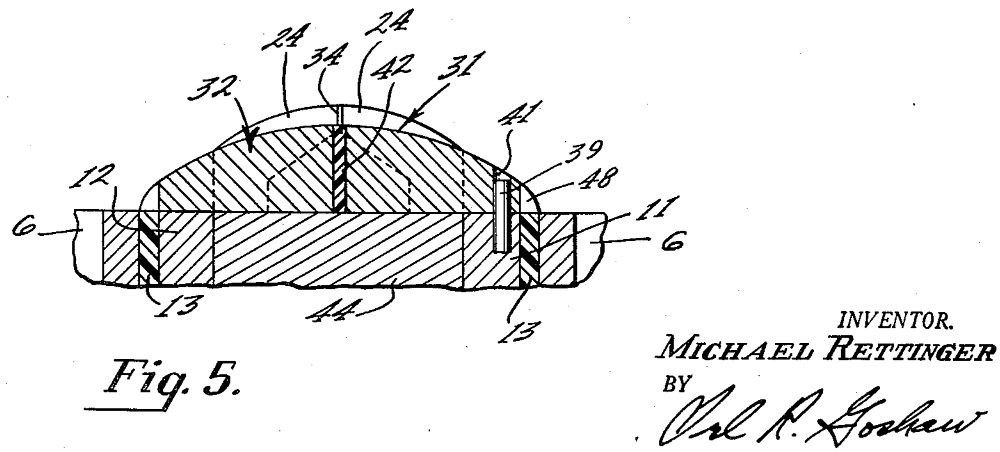
Fig. 5 is a partial cross sectional view taken along the line 5—5 of Fig. 1 to show a registering pin and shield.

As shown in Figs. 1 and 5, locating or registering pins 39 and 40 are forced into holes in the rib members 11 and 12, and are accommodated in holes in sections 31 and 32, the hole in section 31 being shown at 41.

After the sections 31 and 32 and pole tips 21, 22, 23, and 24 have been assembled by screws 33, the space between the edges of the sections and the space between the inner sides of the pole tips is plasticized with the special resin mentioned above, as shown at 42. The pole cap assembly may now be positioned on the registering pins 39 and 40 and screws 28 and 29 inserted to hold the assembly on the main cluster. To improve the operation of the multiple head transducer, Mumetal shields are provided at 44 and 45 between the respective cores, and also a Mumetal shield 46 is provided at the end of the cluster. To accurately position the end of the assembly, a curved rib 48 is provided where the portions 5 and 6 are joined.

As mentioned above, replacing the pole cap assembly may be accomplished in the field by simply removing the screws 28 and 29, removing the worn assembly, and replacing a new assembly on the registering pins 39 and 40, and replacing the screws 28 and 29. Because the pole tips are laminated, the normal magnetic paths and electrical circuits may be used as now being used with high quality standard transducers without the replaceable pole cap feature. That is, if a solid replaceable pole tip is used, it should only have a front gap pole face depth of not more than 0.006 of an inch, which will be the thickness of the individual lamination. However, by using a laminated pole tip construction in the above described assembly, each lamination being 0.006 of an inch, the front gap pole face depth can be several times as large as when a solid unlaminated pole tip is used. The invention also contemplates the use of solid ferrite cores with laminated pole tips, the use of solid cores reducing the bias current requirements when such is desired for recording magnetic heads. Thus, the invention provides high quality magnetic heads with replaceable pole cap assemblies having a much longer life than replaceable pole caps with single solid pole tips.

I claim:

1. A magnetic transducer construction comprising a hollow frame having one side open, longitudinal wall members within said frame, a magnetic core between said wall members, a winding on said core, the ends of said core, the edges of said wall members and the edges of said frame being disposed in the same plane, a casting resin filling the spaces between said longitudinal members, said cores and said frame, and a pole tip assembly including a pair of opposing sections having notches therein, laminated pole tips positioned in said notches in said sections, means for maintaining said pole tips and sections in assembly, and means for attaching said assembly to said longitudinal members.

2. A magnetic transducer construction in accordance with claim 1 in which said pole tip ends adjacent one another have uniform cross sections, and their other ends abut the ends of said core in said plane, and plastic is provided in the space between said last mentioned ends.

3. A magnetic transducer construction in accordance with claim 1 in which said sections have one surface of each in the same plane and another surface of each in a curve having the same radius, said uniform cross sections of said tip ends extending beyond said curve.

4. A magnetic transducer construction in accordance with claim 1 in which a plurality of said cores are positioned in parallel within said frame and a corresponding plurality of pole tips are positioned in said assembly.

5. A replaceable pole tip assembly for a magnetic transducer comprising a pair of opposing non-magnetic sections having one surface of each in the same plane and another surface of each in a curve having the same radius, the opposing edges of said sections having notches therein, and laminated pole tips positioned in said notches, each tip having one end in said plane and the other ends of said tips being adjacent one another, and a spacer between said other ends of said tips.

6. A magnetic transducer in accordance with claim 5 in which said adjacent ends of said tips extend beyond the curved surface of said sections, and casting resin is provided between said opposing edges of said sections.

7. A magnetic transducer in accordance with claim 6 in which said casting resin extends between the ends of said tips in said plane.

8. A magnetic pole tip assembly for the magnetic core of a magnetic transducer comprising a pair of notched sections, the notches in said sections opposing one another, one surface of each of said sections being in one plane and another surface of each section lying in a curve of the same radius, and opposing laminated pole tips in said notches, one end of each of said tips being in said plane and the other ends of said tips being adjacent one another and extending beyond said curved surface.

9. A magnetic pole tip assembly in accordance with claim 8 in which a casting resin is provided in the spaces between said first-mentioned ends of said pole tips, said resin having one surface in said plane.

References Cited in the file of this patent

UNITED STATES PATENTS

| | | |
|---|---|---|
| 2,706,752 | Dupy | Apr. 19, 1955 |
| 2,711,945 | Kornei | June 28, 1955 |
| 2,735,901 | Coates et al. | Feb. 21, 1956 |